United States Patent

[11] 3,628,290

[72] Inventors William Albert John Wilson;
Hempstead Hemel, both of 16 Ravensdell, Hertfordshire, England
[21] Appl. No. 44,754
[22] Filed June 9, 1970
[45] Patented Dec. 21, 1971

[54] GRINDING MACHINES
2 Claims, 1 Drawing Fig.

[52] U.S. Cl.................................................. 51/134.5, 51/166, 64/1, 64/21, 90/11 A
[51] Int. Cl..................................................... B24b 5/00, B24b 41/00
[50] Field of Search........................................... 51/166 R, 166 TS, 134.5; 64/1 C, 1 R, 21, 31, 1 S; 90/11 A

[56] References Cited
UNITED STATES PATENTS

| 1,558,763 | 10/1925 | Rossberg | 64/21 |
| 2,333,025 | 10/1943 | Mayer | 64/1 |
| 2,750,766 | 6/1956 | Griswold | 64/21 |

Primary Examiner—William R. Armstrong
Attorney—Holman & Stern

ABSTRACT: A grinding spindle for supporting and transmitting drive to a rotary grinding wheel, the spindle comprising a head portion whereby the spindle can be secured to a grinding machine, a cylindrical portion extending from the head portion and there being provided within the cylindrical portion, a pair of bores which are inclined to each other and to the axis of the cylindrical portion. The bores contain shafts respectively and which are interconnected by the universal joint. The driven shaft projects from the cylindrical portion and mounts the grinding wheel.

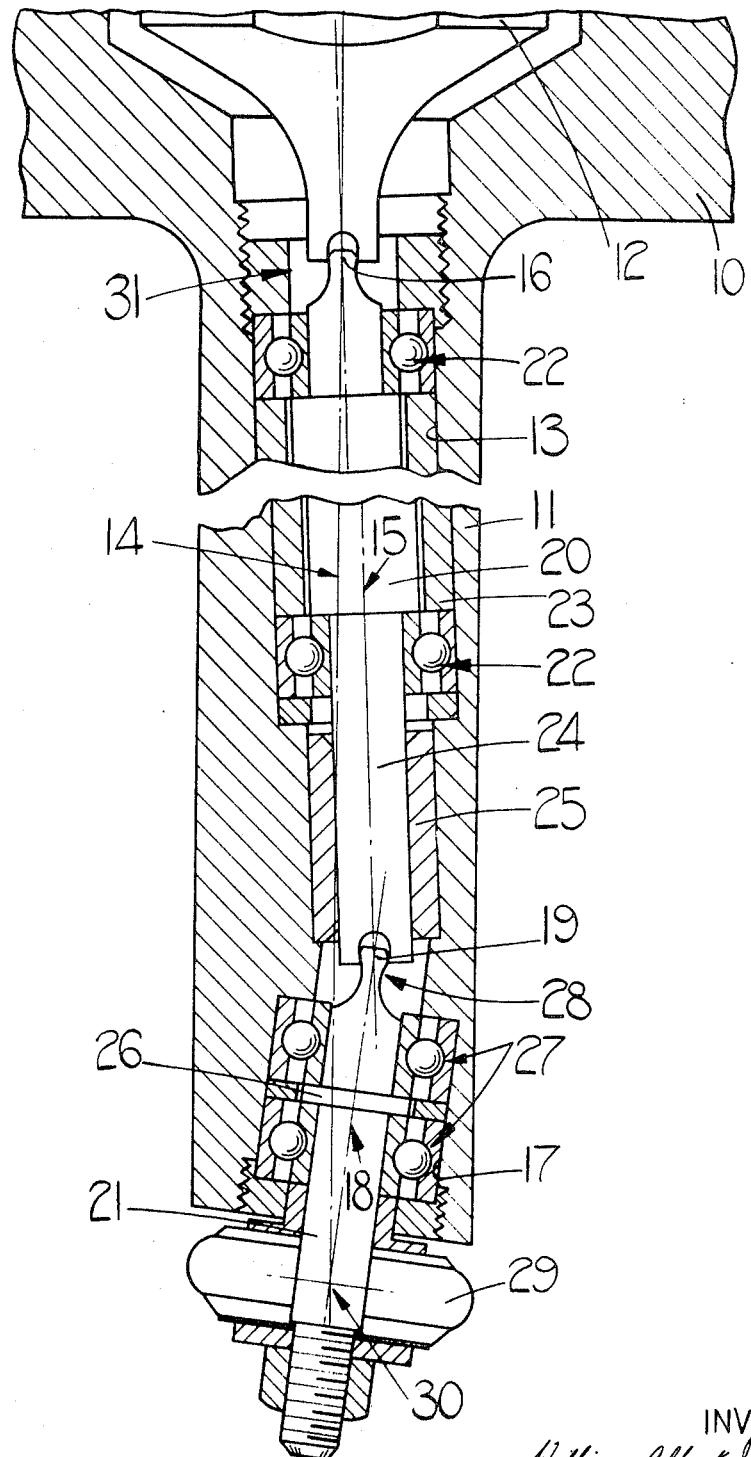

GRINDING MACHINES

This invention relates to a spindle for supporting and transmitting drive to a rotary grinding wheel and has for its object to provide such a spindle in a simple and convenient form.

A grinding spindle in accordance with the invention comprises in combination, a head portion whereby the spindle can be secured to a grinding machine, a cylindrical portion extending from said head portion, a first bore extending within the cylindrical portion from the head portion, said first bore being inclined relative to the axis of said cylindrical portion, a second bore extending into said cylindrical portion from the free end thereof, the axis of said second bore being inclined in the opposite direction to the axis of the first bore, the axes of said bores intersecting at a position inwardly from the free end of the cylindrical portion and offset relative to the axis of the cylindrical portion, first and second shafts journaled in said first and second bores respectively, the adjacent ends of the shafts having universal joint connection whereby drive can be transmitted between the shafts, the free end portion of the second shaft projecting from the second bore and being adapted to receive a grinding wheel, and the free end of the first shaft being adapted to be driven by a driving member carried by the grinding machine.

One example of a grinding spindle in accordance with the invention will now be described with reference to the accompanying drawing. Referring to the drawing there is provided a head portion 10 which in use, is secured to the grinding machine. Extending from the side of the head portion remote from the grinding machine is a cylindrical portion 11 having its axis 14 coinciding with the rotary axis of a driving member 12 of the grinding machine.

Formed in the cylindrical portion if a first bore 13 which extends from the end of the cylindrical portion adjacent the head portion 10. The axis of the bore 13 is indicated at 15 and is inclined relative to the axis 14. These two axes intersect at a point 16 which lies adjacent the opening of the bore 13.

Also formed in the cylindrical portion is a second bore 17 having an axis 18, the second bore extending inwardly from the free end of the cylindrical portion 11. The axes 18 and 15 intersect at a point 19 which is spaced inwardly from the free end of the cylindrical portion 11 and is offset relative to the axis 14.

Mounted within the bores 13 and 17 respectively, are rotary shafts 20 and 21. Considering the shaft 20, this is of stepped form having a wider intermediate portion, and for supporting the shaft, there is provided a pair of ball thrust bearings 22 disposed adjacent the opposite ends of the bore 13. Intermediate the bearings 22 is a sleeve 23 which acts to locate the outer members of the bearings. A reduced portion 24 of the shaft 20 extends within a sleeve bearing 25 carried in a reduced end portion of the bore 13 adjacent the bore 17. The shaft 21 extends from the free end of the cylindrical portion 11 and at a point within the bore 17 is provided with a peripheral flange 26. The shaft is carried by a pair of ball thrust bearings 27 which are secured within the bore 17. The flange 26 is disposed between the inner members of the two bearings and acts to transmit any thrust imposed upon the shaft to the bearings.

The adjacent ends of the shafts 20 and 21 are provided with a universal joint connection 28 and the free end of the shaft 21 is adapted to support a grinding wheel 29. As is shown in the drawing the central plane of the grinding wheel is disposed at right angles to the axis 18 and at an angle to the axis 14 of the cylindrical portion. The axis 14 and 18 intersect at a point 30 which also lies in the plane of the grinding wheel.

The free end of the shaft 20 and the driving member 12 have a universal joint connection 31 and the arrangement is such that upon rotation of the driving member 12 drive will be transmitted to the grinding wheel 29.

Such a spindle as described above is particularly useful for forming a helical groove on an internal surface such for instance as the bore of a ball nut. In this case the inclination of the axis 18 and therefore that of the axis 15 is chosen to accord with the helix angle of the groove. It will be appreciated that any side loads experienced by the grinding wheel during the grinding operation will be absorbed by the cylindrical portion thereby enabling grinding to be carried out in a comparatively deep bore.

Although as described the portion 11 is cylindrical in form where a small grinding wheel is being used it is convenient to relieve the cylindrical portion over its entire length and on the nonthrust side thereof to provide clearance for the grinding wheel.

Having thus described my invention what I claim as new and desire to secure by Letters Patent is:

1. A grinding spindle for supporting and transmitting drive to a rotary grinding wheel and comprising in combination, a head portion whereby the spindle can be secured to a grinding machine, a cylindrical portion extending from said head portion, a first bore extending within the cylindrical portion from the head portion, said first bore being inclined relative to the axis of said cylindrical portion, a second bore extending into said cylindrical portion form the free end thereof, the axis of said second bore being inclined in the opposite direction to the axis of the first bore, the axes of said bore intersecting at a position inwardly from the free end of the cylindrical portion and offset relative to the axis of the cylindrical portion, first and second shafts journaled in said first and second bores respectively, the adjacent ends of the shafts having universal joint connection whereby drive can be transmitted between the shafts, the free end portion of the second shaft projecting from the second bore and being adapted to receive a grinding wheel, and the free end of the first shaft being adapted to be driven by a driving member carried by the grinding machine.

2. A grinding spindle as claimed in claim 1 in which said second shaft is mounted by a pair of spaced combined journal and thrust bearings within said second bore.

* * * * *